United States Patent
Huang

(10) Patent No.: US 8,797,476 B2
(45) Date of Patent: Aug. 5, 2014

(54) CIRCUIT BOARD COVER-PLATE, LIQUID CRYSTAL MODULE AND DISPLAY

(75) Inventor: Chong Huang, Shenzhen (CN)

(73) Assignee: Shenzhen China Star Optoelectronics Technology Co. Ltd., Shenzhen, Guangdong Province (CN)

( * ) Notice: Subject to any disclaimer, the term of this patent is extended or adjusted under 35 U.S.C. 154(b) by 220 days.

(21) Appl. No.: 13/380,898

(22) PCT Filed: Dec. 2, 2011

(86) PCT No.: PCT/CN2011/083399
§ 371 (c)(1),
(2), (4) Date: Dec. 26, 2011

(87) PCT Pub. No.: WO2013/078688
PCT Pub. Date: Jun. 6, 2013

(65) Prior Publication Data
US 2013/0135551 A1    May 30, 2013

(30) Foreign Application Priority Data
Nov. 29, 2011   (CN) .......................... 2011 1 0387518

(51) Int. Cl.
*G02F 1/1333*    (2006.01)

(52) U.S. Cl.
USPC ............................................................ 349/58

(58) Field of Classification Search
None
See application file for complete search history.

(56) References Cited

U.S. PATENT DOCUMENTS

| | | | |
|---|---|---|---|
| 6,229,584 B1 * | 5/2001 | Chuo et al. ...................... | 349/58 |
| 6,946,798 B2 * | 9/2005 | Kawaguchi et al. ............. | 315/85 |
| 2003/0124884 A1 * | 7/2003 | Katsumata et al. .......... | 439/76.2 |
| 2007/0247870 A1 * | 10/2007 | Sakai et al. ................... | 362/612 |

* cited by examiner

Primary Examiner — Wen-Ying P Chen
(74) Attorney, Agent, or Firm — Cheng-Ju Chiang

(57) ABSTRACT

A liquid crystal module is disclosed, which comprises a backplate, a circuit board and a circuit board cover-plate. The circuit board is fixed to the backplate, and the circuit board cover-plate is fixed to the backplate by magnetic elements. Furthermore, a display comprising the aforesaid liquid crystal module is further disclosed. The liquid crystal module of the present disclosure has the circuit board cover-plate thereof fixed to the backplate by means of magnetic elements. Therefore, when it is necessary to carry out defect detection and corresponding electrical inspections on the liquid crystal module, the circuit board cover-plate can be opened rapidly to carry out corresponding operations, which is efficient and time-saving.

15 Claims, 2 Drawing Sheets

CIRCUIT BOARD COVER-PLATE, LIQUID CRYSTAL MODULE AND DISPLAY

FIELD OF THE INVENTION

The present disclosure relates to a display and a liquid crystal module thereof, and more particularly, to a means for fixing a circuit board in a liquid crystal module.

BACKGROUND OF THE INVENTION

As display technologies become sophisticated and the displays are widely used, manufacturing displays efficiently in large batches has become an important means for manufacturers to gain a competitive edge in the market.

Liquid crystal modules of thin film transistor liquid crystal displays (TFT-LCDs) currently available require use of a circuit board (i.e., a chip on board (COB)). Corresponding signals are converted by this circuit board and then outputted to a liquid crystal panel so as to drive the liquid crystal panel to display a desired image.

Specifically, a liquid crystal module in the prior art comprises a backplate, a circuit board and a circuit board cover-plate. The backplate is made of a metal material, the circuit board is fixed on the backplate, and the circuit board cover-plate is fixed to the backplate by bolts.

When it is necessary to carry out defect detection and corresponding electrical inspections (e.g., to detect tone defects or abnormal displaying conditions) on the liquid crystal module, the circuit board cover-plate must be opened firstly. However, opening the circuit board cover-plate requires use of a screwdriver to remove the bolts one by one before the defect detection and the corresponding electrical inspections can be carried out.

Accordingly, because the circuit board cover-plate is fixed to the backplate by bolts in the prior art, the process of carrying out defect detection and corresponding electrical inspections on the liquid crystal module is very complex, inefficient and time-consuming, which considerably degrades the production efficiency of the displays and the liquid crystal modules thereof.

SUMMARY OF THE INVENTION

The primary objective of the present disclosure is to provide a display and a liquid crystal module thereof, which are intended to solve the aforesaid problem of the prior art that the process of carrying out defect detection and corresponding electrical inspections on the liquid crystal module is very complex, inefficient and time-consuming because the circuit board cover-plate is fixed to the backplate by bolts.

To achieve the aforesaid objective, the present disclosure provides a circuit board cover-plate, which comprises:
  magnetic elements inlaid on the circuit board cover-plate.

To achieve the aforesaid objective, the present disclosure further provides a liquid crystal module, which comprises:
  a backplate;
  a circuit board fixed to the backplate; and
  a circuit board cover-plate fixed to the backplate by magnetic elements.

According to a preferred embodiment of the present disclosure, the circuit board is fixed to the backplate by a bolt.

According to a preferred embodiment of the present disclosure, the magnetic elements are integrally over-molded in the circuit board cover-plate.

According to a preferred embodiment of the present disclosure, the magnetic elements are inlaid on the circuit board cover-plate.

According to a preferred embodiment of the present disclosure, the magnetic elements are adhered to the circuit board cover-plate.

According to a preferred embodiment of the present disclosure, the magnetic elements are distributedly disposed on the circuit board cover-plate.

According to a preferred embodiment of the present disclosure, the magnetic elements are distributedly disposed along an edge of the circuit board cover-plate.

According to a preferred embodiment of the present disclosure, the magnetic elements are distributedly disposed at four corners of the circuit board cover-plate.

According to a preferred embodiment of the present disclosure, the backplate is provided with at least one locating element.

According to a preferred embodiment of the present disclosure, locating portions for mating with the at least one locating element are disposed on the circuit board and the circuit board cover-plate.

According to a preferred embodiment of the present disclosure, each of the at least one locating element is a locating post protruding from the backplate, and each of the locating portions is a locating hole.

To achieve the aforesaid objective, the present disclosure further provides a display, which comprises the aforesaid liquid crystal module.

The embodiments of the present disclosure have the following benefits: as compared with the prior art, the liquid crystal module of the present disclosure has the circuit board cover-plate thereof fixed to the backplate by means of magnetic elements. Therefore, when it is necessary to carry out defect detection and corresponding electrical inspections on the liquid crystal module, the circuit board cover-plate can be detached directly without the need of a screwdriver. In this way, the circuit board cover-plate can be opened rapidly to carry out defect detection and corresponding electrical inspections on the liquid crystal module so that troubles of the circuit board can be shot or found rapidly, which can greatly improve the production efficiency.

BRIEF DESCRIPTION OF THE DRAWINGS

In order to more clearly describe the technical solutions of the embodiments of the present disclosure, attached drawings to be used in the detailed description of the disclosure will be briefly described hereinbelow. Obviously, the attached drawings described hereinbelow only illustrate some of the embodiments of the present disclosure, and those of ordinary skill in the art can also obtain other attached drawings therefrom without the need of making inventive efforts, wherein.

DETAILED DESCRIPTION OF THE INVENTION

Figure 1:
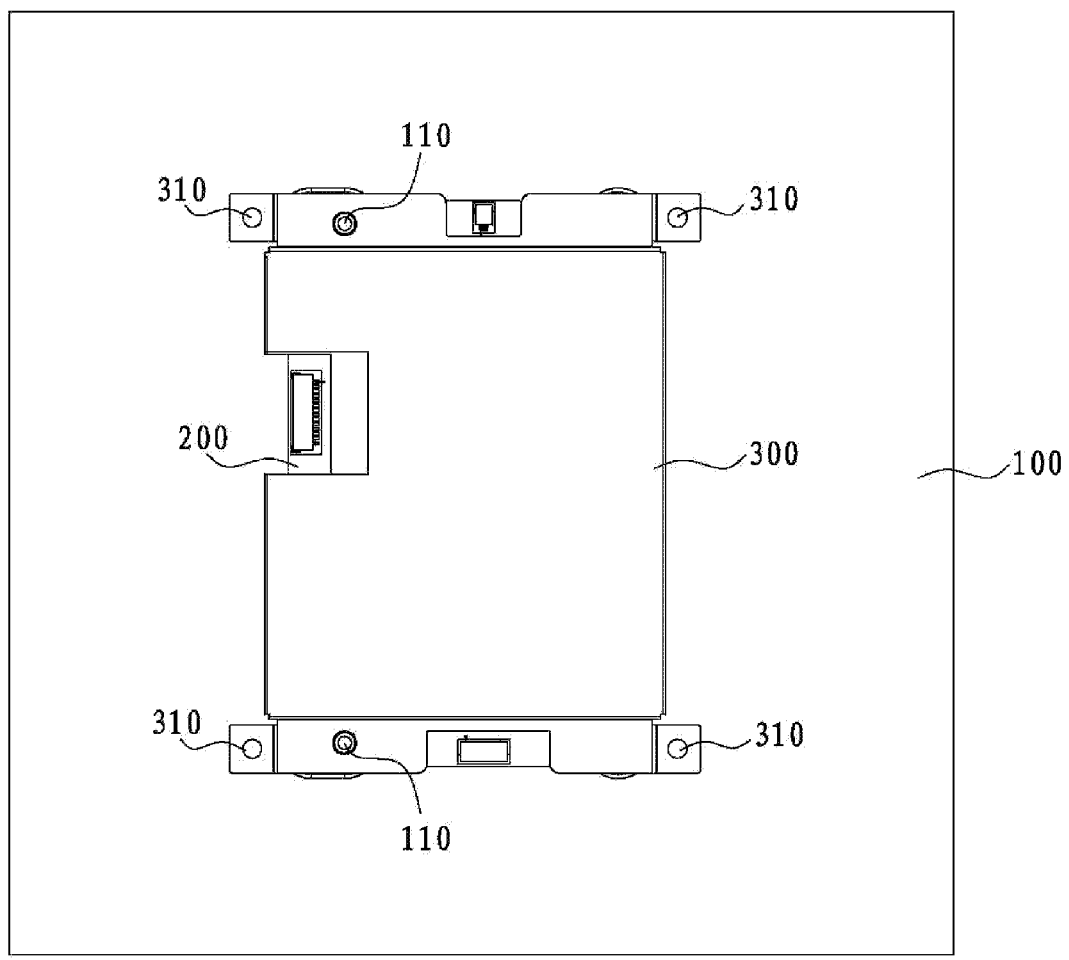
FIG. 1 is a schematic top view illustrating a structure of a liquid crystal module according to a preferred embodiment of the present disclosure.

Various embodiments of the disclosure are now described in detail. Referring to the drawings, like numbers indicate like parts throughout the views. As used in the description herein and throughout the claims that follow, the meaning of "a,"

"an," and "the" includes plural reference unless the context clearly dictates otherwise. Also, as used in the description herein and throughout the claims that follow, the meaning of "in" includes "in" and "on" unless the context clearly dictates otherwise.

Hereinbelow, the technical solutions of embodiments of the present disclosure will be described clearly and completely with reference to the attached drawings. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Referring to FIG. 1, there is shown a schematic top view illustrating a structure of a liquid crystal module according to a preferred embodiment of the present disclosure. As shown in FIG. 1, this embodiment of the present disclosure provides a liquid crystal module 10, which comprises a backplate 100, a circuit board 200 and a circuit board cover-plate 300. Of course, the liquid crystal module 10 also comprises other layer structures and optical elements, which are unrelated to the present disclosure and thus will not be described specifically herein.

In this embodiment of the present disclosure, the backplate 100 is made of a metal material (e.g., an electrolytic galvanized steel sheet (SECC)). The circuit board 200 is fixed to a corresponding position on the backplate 100 by a bolt 210 (see FIG. 3) or other means. As shown in FIG. 1, the circuit board cover-plate 300 is fixed to the backplate 100 by magnetic elements 310; and the magnetic elements 310 are distributedly disposed at four corners of the circuit board cover-plate 300, but the present disclosure is not limited thereto.

In this embodiment of the present disclosure, the circuit board cover-plate 300 may be made of a plastic material or some other material.

If the circuit board cover-plate 300 is made of a plastic material, then the magnetic elements 310 may be integrally over-molded in, inlaid on or adhered to the circuit board cover-plate 300.

If the circuit board cover-plate 300 is made of some other material, then the magnetic elements 310 are usually inlaid on or adhered to the circuit board cover-plate 300.

Of course, it will be readily conceived by people skilled in the art that, the magnetic elements 310 may also be inlaid on and further adhered to (e.g., using a super glue) the circuit board cover-plate 300 so as to ensure that the magnetic elements 310 are stably joined to the circuit board cover-plate 300. The inlaying may be accomplished by interference fit, snap-fit or the like that is known in the prior art.

Figure 2:
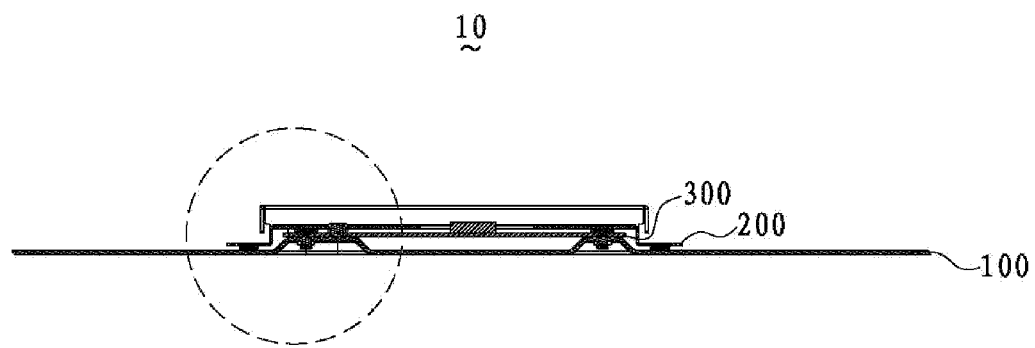
FIG. 2 is a schematic cross-sectional view illustrating the structure of the liquid crystal module shown in FIG. 1.
Figure 3:
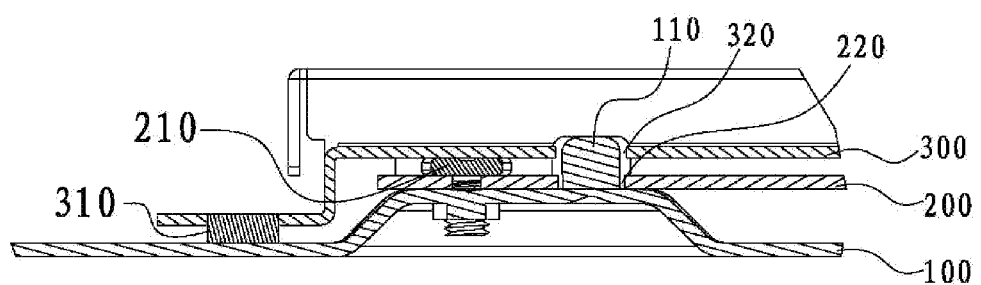
FIG. 3 is a schematic enlarged view illustrating the structure within the dashed circle shown in FIG. 2.

Referring to FIG. 2 and FIG. 3 together, FIG. 2 is a schematic cross-sectional view illustrating the structure of the liquid crystal module shown in FIG. 1; and FIG. 3 is a schematic enlarged view illustrating the structure within the dashed circle shown in FIG. 2.

As shown in FIG. 2 and FIG. 3, in this embodiment of the present disclosure, the backplate 100 is provided with at least one locating element 110, and locating portions for mating with the at least one locating element 110 are disposed on the circuit board 200 and the circuit board cover-plate 300.

Specifically, each of the at least one locating element 110 is a locating post protruding from the backplate 100, and the locating portions are a locating hole 220 and a locating hole 320 formed in the circuit board 200 and the circuit board cover-plate 300 respectively. By inserting the locating post through the locating holes 220 and 320, it is convenient to install the circuit board 200 and the circuit board cover-plate 300 exactly.

Furthermore, an embodiment of the present disclosure further provides a display (e.g., a flat-panel display) which comprises the liquid crystal module 10.

According to the above descriptions, it will be readily appreciated by people skilled in the art that, the liquid crystal module 10 of the present disclosure has the circuit board cover-plate 300 thereof fixed to the backplate 100 by means of magnetic elements 310. Therefore, when it is necessary to carry out defect detection and corresponding electrical inspections on the liquid crystal module 10, the circuit board cover-plate 300 can be detached directly without the need of a screwdriver. In this way, the circuit board cover-plate 300 can be opened rapidly to carry out defect detection and corresponding electrical inspections on the liquid crystal module 10 so that troubles of the circuit board 200 can be shot or found rapidly, which can greatly improve the production efficiency.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal module, comprising:
   a backplate;
   a circuit board fixed to the backplate; and
   a circuit board cover-plate fixed to the backplate by magnetic elements;
   wherein the backplate is provided with at least one locating element, and locating portions for mating with the at least one locating element are disposed on the circuit board and the circuit board cover-plate.

2. The liquid crystal module of claim 1, wherein the circuit board is fixed to the backplate by a bolt.

3. The liquid crystal module of claim 1, wherein the magnetic elements are integrally over-molded in the circuit board cover-plate.

4. The liquid crystal module of claim 1, wherein the magnetic elements are inlaid on the circuit board cover-plate.

5. The liquid crystal module of claim 1, wherein the magnetic elements are adhered to the circuit board cover-plate.

6. The liquid crystal module of claim 2, wherein the magnetic elements are distributedly disposed on the circuit board cover-plate.

7. The liquid crystal module of claim 1, wherein the magnetic elements are distributedly disposed along an edge of the circuit board cover-plate.

8. The liquid crystal module of claim 1, wherein the magnetic elements are distributedly disposed at four corners of the circuit board cover-plate.

9. The liquid crystal module of claim 1, wherein each of the at least one locating element is a locating post protruding from the backplate, and each of the locating portions is a locating hole.

10. A display, comprising a liquid crystal module, wherein the liquid crystal module comprises:
    a backplate;
    a circuit board fixed to the backplate; and
    a circuit board cover-plate fixed to the backplate by magnetic elements;
    wherein the backplate is provided with at least one locating element, and locating portions for mating with the at least one locating element are disposed on the circuit board and the circuit board cover-plate.

11. The display of claim 10, wherein the circuit board is fixed to the backplate by a bolt.

12. The display of claim 10, wherein the magnetic elements are integrally over-molded in, inlaid on or adhered to the circuit board cover-plate.

13. The display of claim 12, wherein the magnetic elements are distributedly disposed along an edge of the circuit board cover-plate.

14. The display of claim 12, wherein the magnetic elements are distributedly disposed at four corners of the circuit board cover-plate.

15. The display of claim 10, wherein each of the at least one locating element is a locating post protruding from the backplate, and each of the locating portions is a locating hole.

* * * * *